May 31, 1966   J. M. FINLAY ETAL   3,254,219
NUCLEAR BLAST DETECTOR AND ALARM SYSTEM
Filed Jan. 7, 1963   2 Sheets-Sheet 1

INVENTOR.
Joseph M. Finlay
Charles D. Price
BY Wood, Herron and Evans
ATTORNEYS

United States Patent Office 3,254,219
Patented May 31, 1966

3,254,219
NUCLEAR BLAST DETECTOR AND ALARM SYSTEM
Joseph M. Finlay, Fairfield, and Charles D. Price, Newark, Ohio, assignors to The Mosler Safe Company, Hamilton, N.Y., a corporation of New York
Filed Jan. 7, 1963, Ser. No. 249,734
7 Claims. (Cl. 250—83.3)

This invention relates to a method and apparatus for detecting nuclear explosions and initiating protective measures.

In nuclear bomb shelter installations it is usually necessary to take last minute "button-up" precautions to prevent damage from near-miss nuclear explosions. Blast valves in the shelter air ducts must be closed to prevent the shock wave of the blast from entering the ducts. Diesel operated generators must be shut down when the closed blast valves cut off the external air supply, auxiliary utilities must be started in operation, dampers must be closed, air filters activated, alarms sounded, and other warning and protective devices must be actuated.

Normally these protective measures may be taken upon receiving warning of an expected attack, but in event of a surprise attack the first warning may be the nuclear explosion itself. The explosion must be detected and identified and the warning or protective devices actuated within a fraction of a second to give such devices a chance to operate. The short warning time available necessitates a system which is not dependent on human actuation.

This invention relates to a system whereby a nuclear blast in the vicinity of the system is automatically detected and identified, and whereby protective measures are automatically initiated and carried out. In broad terms, the system of this invention will very rapidly provide an electrical signal upon detection of a nuclear detonation, which signal may be utilized to take desired protective measures, including closing blast valves, energizing or shutting down utility circuits, sounding warnings, and other operations.

It is characteristic of all known types of nuclear explosions that the explosion is accompanied by a so-called optical or thermal signal in the form of released ultraviolet, visual, and infrared energy which is concentrated primarily in two pulses. The relative amplitude and duration of the two light flashes from the nuclear blast vary widely with the size and type of the nuclear device, atmospheric conditions, and other factors, but the two-pulse wave form is characteristic of the thermal signal which occurs in any nuclear blast.

The pattern of the released thermal energy of nuclear detonations is further characterized by a peculiar and unique difference in the shape of the two pulses. The first or initial pulse occurs simultaneously with detonation of the weapon, and is typically a very fast rising, sharp spike of short duration, usually of roughly about 7–15 milliseconds duration. The energy of this first pulse is primarily in the ultra-violet spectrum, although infrared energy is also preesnt to a lesser extent. The second pulse follows the first by a time lag which varies with the size of the weapon, and which may be from a few hundred milliseconds to several seconds. Typically, the second pulse is much "broader" and slower rising than the first, and has a duration of at least above a second; usually approximately 99% of the total thermal energy of the explosion is released during this second pulse. Its energy is primarily in the visual and infrared spectrums. The total duration of both pulses may be several seconds. Between the fast rising spike-like first pulse and the slow rising, longer lasting second pulse, released thermal energy is relatively low, so that the pulses are quite distinctly separated. The pressure or shock wave of the blast follows the second pulse, and may arrive very rapidly thereafter, depending on the nearness and size of the blast. No other type of event, either natural, such as lightning, or man-caused, is known to emit thermal energy in such a pattern.

Detection systems based solely upon recognition of a fast rising spike of thermal energy have proven unreliable and subject to false alarms, because similar light energy pulses are sometimes produced by lightning, chemical explosions, and other non-nuclear events. For this reason, systems based upon detection of a fast rising energy pulse alone have been undesirably indiscriminate in operation. Apart from their psychological effect, false alarms have sometimes required manual resetting of blast valves, which may be time consuming where there are several valves hundreds of feet apart, especially if explosive cartridges must be replaced.

For this reason, most nuclear blast detection and alarm systems are based upon recognition of a fast pulse of predetermined amplitude followed by a relatively slow rising, longer lasting thermal pulse corresponding to the second pulse of a nuclear blast. In the past, such recognition has been based upon photoelectric actuation of an electronic circuit by a fast-rising pulse of radiation, which circuit then sets up an associated second circuit for subsequent actuation by a slower rising pulse of radiation. If a slow rise pulse of predetermined intensity is detected after detection of the fast rising pulse, the protective measures are thereupon initiated.

Although past systems based upon recognition of the two-pulse characteristic of nuclear detonations have had a much lower incidence of false alarms than single pulse detection systems, the inherent necessity in past systems of sensing and responding to the slow rise second pulse has rendered them undesirably slow in operation. The protective measures, actuated following detection of the second pulse, require a certain amount of time in which to be completed; blast valves may, for example, require a tenth of a second to close, and the shock wave, if the blast is a near miss, might arrive before the valve is closed. In such systems, the time required after detection of the secondary pulse to initiate and execute the mechanical protective measures could, in some instances, cause those measures to be too late or to be ineffectual in part.

This invention is predicated upon the conception, discovery, and determination that detection of a fast-rise time thermal signal can be utilized to tentatively establish recognition of the blast and to initiate or actuate various protective or alarm measures, especially those which are time-critical such as closing shelter blast valves, and that detection thereafter of a slow rising second thermal signal can be utilized to confirm the tentative recognition established by detection of the first signal, to permit the previously initiated measures to continue and to initiate less time-critical measures such as diesel shutdown, or to return the system to normal in the event a second pulse is not received. In this manner, significant and perhaps vital extra operating time is attained.

Otherwise expressed, unlike past systems, the blast detecting and alarm system of this invention takes advantage of detection of a fast-rise time thermal pulse to achieve quicker operational response to detonation of a nuclear weapon, and incorporates reversible primary protective means which are automatically returned to normal if the tentative identification of the first pulse is not verified by detection of a slow rise time second pulse within a pre-established time thereafter.

More specifically, this system responds to a fast rising, high amplitude light or thermal pulse to execute or set in operation the primary or most critical protective measures, such as closing the blast valves in shelter air ducts. Detection of the fast pulse also initiates a time period of predetermined duration, during which a slow rising signal must be detected to permit the previously initiated primary measures to be completed or to remain in effect if completed. A slow-rise pulse occurring during this period corroborates the initial, possibly inaccurate blast recognition established by detection of the fast spike, and permits the blast valves to continue closing, or to remain closed if they have already closed. In addition, detection of a slow rise signal may also be used to actuate less time-critical secondary protective measures, such as shutting down diesel engines, activating the filter system, closing dampers, sounding alarms, and other measures which cannot so readily be reversed or returned to normal status.

If no slow rise is detected after the fast rise signal, the system outputs are inhibited and the system is returned to normal, without serious "false alarm" effect.

Another important feature of the invention resides in the concept that if the system detects only a slow rise signal, not preceded by a fast rising signal, all of the protective measures are thereupon actuated.

The system advantageously incorporates blast valves of a type which can be remotely reopened without adverse effect, so that if the first signal is not confirmed by a second signal the valve can automatically be returned to open on normal condition. Preferably, although not necessarily, the system is used in association with one or more blast valves which are pneumatically operated, each having a movable valve member positionable in either open or closed position by a piston to which air under pressure is supplied through a solenoid controlled three-way valve. With a blast valve of this type, detection of a fast rising pulse causes the system to supply an electrical output which actuates the blast valve pneumatic control so that the blast valve is started closing. The amount of time required for closure depends upon the specific size and construction of the blast valve, but in any event, whether or not the valve is fully closed, if the initial thermal impulse is not soon confirmed by a following slow rise impulse, the pneumatic valve controls will be reversed so that the blast valve is returned to open condition. In this manner, the blast valve, which is one of the most time-critical protective devices, is closed before arrival of the shock wave. Other protective devices or measures such as alarms, auxiliary generators, air filters and so on which are not so time-critical, and which are not so easily or so freely reversed if the initial pulse is not confirmed, are shut down or actuated only upon confirmation of the first pulse by a second pulse.

The electrical circuitry for the detecting and alarm system preferably includes optical or thermal sensor means supplying an electrical output upon detecting a pulse of light or infrared energy. Advantageously a plurality of such sensors are connected in parallel, so that a pulse from any one will cause the system to respond. The sensor responds both to fast rise pulses and to slow rise pulses by supplying an electrical output signal of related waveform; discrimination between these electrical signals is provided by a filter circuit to which the sensor or sensors are coupled.

The filter rejects very high frequency signals, and also prevents unwanted very slow rise signals from passing on. The fast rise signal is used to open a "fast output" relay which controls the primary protective measures which are to be operated upon detection of the fast signal. At the same time, a signal is provided to a circuit which controls the length of time that the fast output relay will remain open; this period can be adjusted within a time range, and after this period, if a slow rise signal has not been received, the fast output relay will be reclosed and the previously started protective measures will be cancelled, further outputs inhibited, and the system returned to normal.

A slow output relay is operated by circuitry which responds only to detection of a slow rise signal. If such a signal arrives subsequent to a fast signal and within the timed period established by detection of the fast signal, the fast output relay remains open, and the slow output relay is also opened, which may be used to start less time-critical protective measures, as previously explained.

The nuclear blast detector and alarm system which we have invented, and the concepts upon which it is based, may best be further explained by reference to the accompanying drawings in which.

Figure 1:
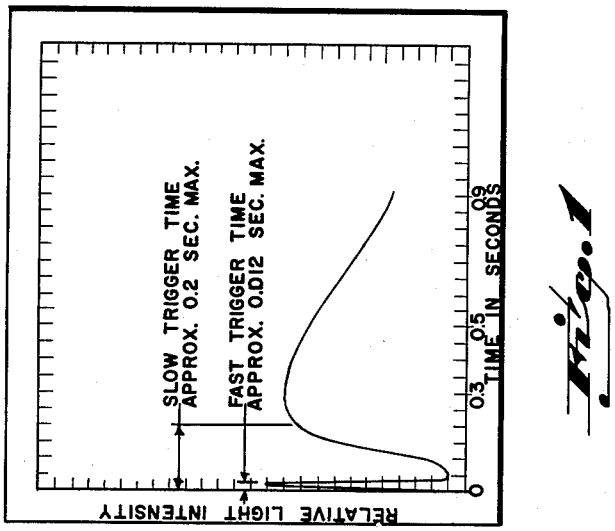
FIGURE 1 is a graph which illustrates, in diagrammatic form, the general shape of the thermal energy wave produced by detonation of a nuclear device.

The illustration in FIGURE 1 of the approximate wave form of the thermal energy released by a nuclear detonation is intended to be representative rather than definitive. In general, as shown in the graph, the initial spike is very fast rising, and reaches its peak amplitude in about 10 milliseconds. The system of this invention responds to detection of a fast rising initial pulse having an amplitude in excess of a predetermined amount to trigger or start the blast valve closing.

It will also be seen in FIGURE 1 that the second pulse of a blast rises to its peak amplitude more gradually than the first pulse, and is longer lasting. As illustrated, the slow pulse may peak about 0.2 second (200 milliseconds) after detonation blast, although this time will vary with the size and condition of the blast.

Figure 2:
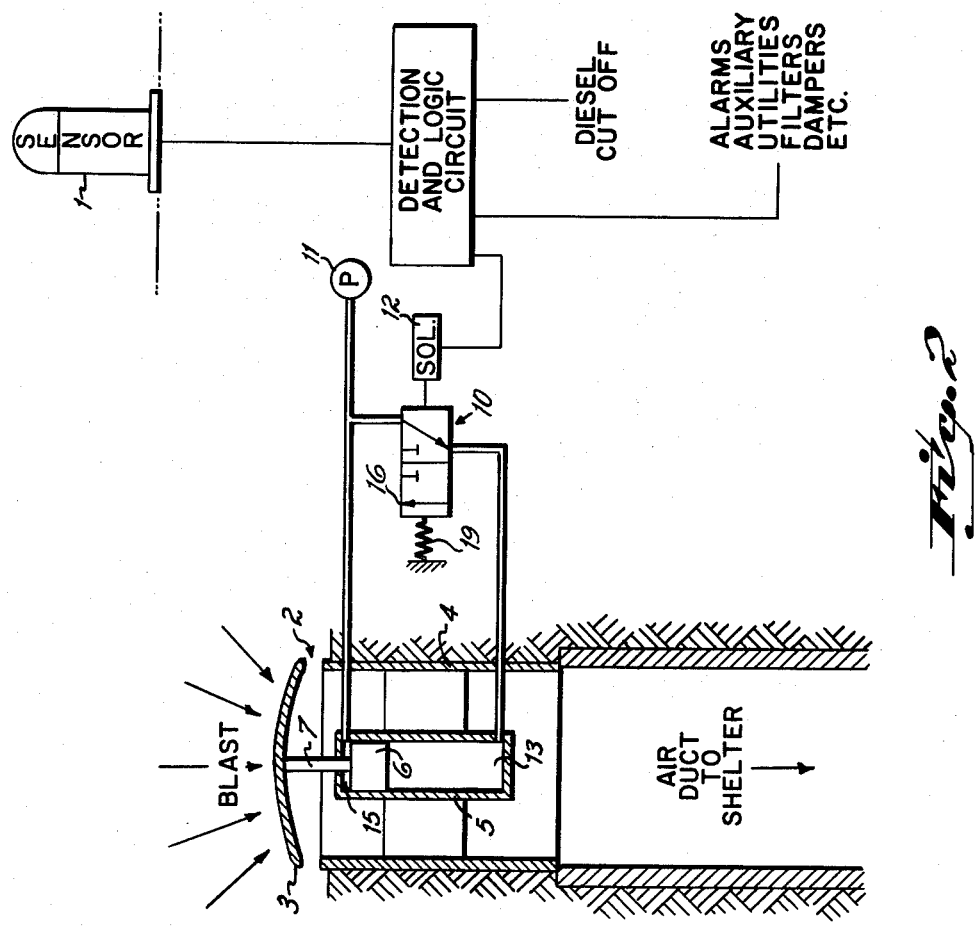
FIGURE 2 is a diagrammatic illustration showing a typical installation of the system we have invented, and which illustrates the general details of a suitable blast valve controlled by the system.

Closure of a blast valve of the type shown in FIGURE 2 may require only 100 milliseconds, so that if, in accordance with the invention, the valve is started closing upon detection of the fast pulse, it will be fully closed by the second pulse and shock wave arrival.

In FIGURE 2, the sensor whereby the thermal energy released by the blast is converted to electrical signals to actuate the system, is illustrated diagrammatically at 1. Sensors of suitable type are themselves known, and do not of themselves comprise the invention. The sensor may be positioned on a building or tower, away from the remainder of the circuitry. The electrical impulses generated by the sensor in response to an impinging thermal wave actuate a detection and logic circuit which is electrically connected to the sensor and which is shown schematically in FIGURE 2. The detection and logic circuit operates one or more electrically controlled blast valves, of which a suitable configuration is designated generally by 2.

The blast valve 2 is usually placed at the entrance to, or in, a shelter air duct, either in the air intake or exhaust or both. The valve 2 advantageously comprises a dome-shaped movable valve member 3, which is positionable with respect to a cylindrical fixed valve member 4, which in turn leads to the air duct. A cylinder 5 is supported in the center of the cylindrical member 4, and this cylinder 5 includes a movable piston 6, which is connected for moving the movable valve member 3 by a rod 7. Actuation of the piston 6 may suitably be effected through a solenoid controlled, spring return three-way valve which is designated by numeral 10 in FIGURE 2. A pump or accumulator 11 supplies air under pressure; the valve 10 has a shiftable valve member, which when its operating solenoid 12 is energized, supplies air under pressure through a line 14 to chamber 13 beneath the lower end of the valve piston 6. Air under pressure is supplied at all times to chamber 15, above piston 6. Equal pressures in chambers 13 and 15 establish a differential force on piston 6 by reason of the displacement of rod 7. This differential force causes the piston 6, rod 7, and the movable valve member 3 to open and remain in open position. When the solenoid 12 is de-energized, a spring 19 moves the shiftable valve member of the control valve 10 so that the pressurized air supply to chamber 13 is blocked and pressure in chamber 13 is released to atmosphere at port 16. At the same time, pressure from pump 11 is maintained in chamber 15, causing piston 6 to move downwardly and close the blast valve, effecting a tight seal between the movable head 3 and the body 4. Thus, so long as solenoid 12 is energized, the blast valve remains open, and when the solenoid 12 is de-energized, the valve will automatically close. It will be seen that the system is fail safe, in that if for any reason electrical energy is disrupted the blast valve will close.

By reason of the partial actuation of the system in response to fast rising signals, it is contemplated that the blast valve 2 may be closed from time to time in response to spurious signals such as lightning, shell burst, and so on. Such false alarms do not here present a problem, inasmuch as the valve will soon automatically be re-opened, and also because the other, less time-critical measures do not operate until the entire blast waveform has been detected and recognized.

Figure 3:
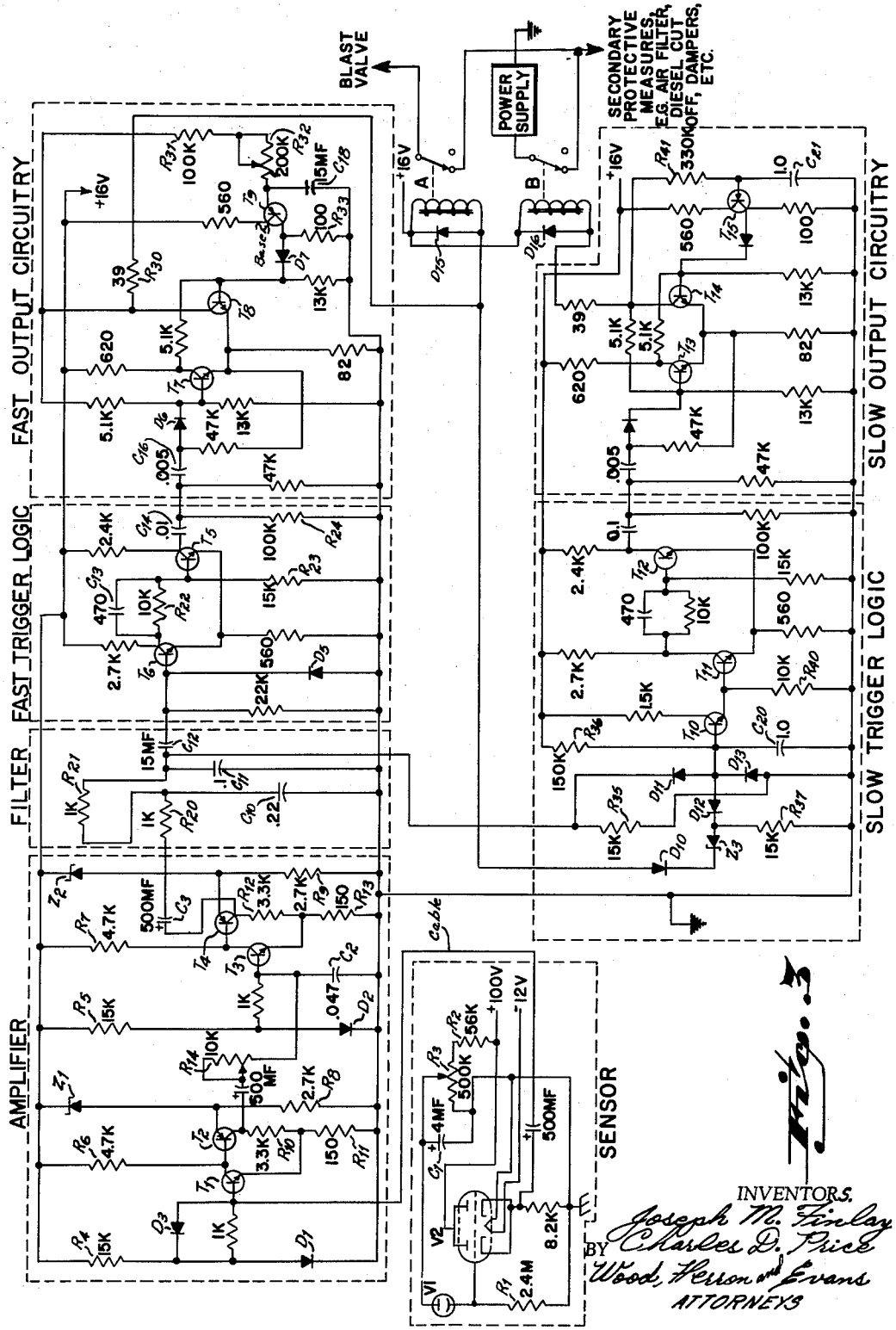
FIGURE 3 is a circuit diagram of a suitable electric circuit for use in the system of this invention.

FIGURE 3 is a schematic diagram of one embodiment of a suitable electronic circuit for operating the detecting system of this invention. It will be realized that the operating principles of the system we have invented may be embodied in other electronic circuits, and that the circuit illustrated in FIGURE 3 is given by way of completeness of disclosure rather than by way of limitation.

In FIGURE 3, the values of the various circuit resistors and capacitors are indicated beside the respective circuit elements. It is understood that the figures beside the resistors refer to ohms, while the figures beside the capacitors refer to microfarads.

The circuit illustrated in FIGURE 3 operates a pair of output relays, one of which is a fast signal relay designated by A, and the second of which is a slow signal relay designated by B. The circuit is fail-safe; that is, both relays A and B are normally energized, and actuate the various devices which they control when they are de-energized.

A power supply is connected through the normally closed contact of slow signal relay B to the protective devices which are to be actuated only upon detection of the slow signal; as previously explained, such devices may comprise alarms, air filter activating mechanisms, diesel engine controls, auxiliary utility circuits and the like. It is contemplated that relay B may have multiple contacts for actuating the various measures, or that relay B may open one or more circuits to relays which directly control the protective measures.

The power supply is also connected through the normally closed pole of slow relay B to the primary or most time-critical protective devices, for example the blast valve, through the normally closed pole of fast signal relay A. Thus, it will be seen that if relay A is de-energized, the armature of relay A will open its normally opened contact, thereby activating the blast valve. Current is maintained in relay B after relay A has opened until a slow rise pulse is detected, whereupon relay B is opened, thereby activating the secondary protective measures. It will also be apparent that opening of relay B, even though relay A may be closed, will activate all of the protective measures, both the blast valve and the secondary measures, because the contacts of relay A are in series with the contacts of relay B.

In FIGURE 3, each of the various functional groups or components of the circuit is shown within dotted lines. Broadly speaking, the circuit comprises a sensor, an amplifier, a filter, a fast trigger logic section, fast output circuitry, a slow trigger logic section and slow output circuitry.

The sensor may be a simple infrared detector. The phototube, which is identified as $V_1$ in FIGURE 3 is a type 928 tube. This tube changes the light energy of the pulse directly into an electrical wave the envelope of which approximates that of the received light. The electrical signal is developed across resistor $R_1$ and is directly coupled to the grid of tube $V_2$, which may be a 12AU7 tube. Tube $V_2$ is a cathode follower used to transform the high impedance of resistor $R_1$ to a low impedance suitable for coupling through a long cable. Resistor $R_2$ and capacitor $C_1$ filter out any ripple present on the +100 volts input to the sensor. Resistor $R_3$ acts as a sensitivity control for the phototube $V_1$. It has been determined in actual practice that by this control the system may be set so as to be responsive to only the closest lightning flashes. It is contemplated that the sensor may be heated by suitable means not shown, for all-weather operation at a position removed from the remainder of the electronic components. Except for extreme cases, the sensor is unresponsive to lightning, the radiant energy of which is primarily in the ultraviolet spectrum.

Basically, the signal amplifier is a feed-back pair of amplifier stages employing complementary transistors achieving a minimum gain of 10. The two amplifier stages are similar, the only difference between them being capacitor $C_2$ in the second stage, which is an oscillation suppressing capacitor, and capacitor $C_3$ also in the second stage, which is a coupling capacitor for the filter section. The amplifier includes transistors $T_1$, $T_2$, $T_3$, and $T_4$; $T_1$ and $T_3$ are type 2N1302, and $T_2$ and $T_4$ are type 2N1303 transistors. A resistor $R_4$ and a diode $D_1$ set the bias for transistor $T_1$. Similarly, a resistor $R_5$ and a diode $D_2$ set the bias for transistor $T_3$. Resistors $R_6$ and $R_7$ allow sufficient current to flow through transistors $T_1$ and $T_3$ respectively to offset changes due to $1_{co}$. The Zener diode $Z_1$, diode $D_3$ and resistor $R_8$ limit the emitter to collector voltage on transistor $T_1$. In the second stage, Zener diode $Z_2$ and resistor $R_9$ have a similar effect. Diode $D_3$ also prevents excessive positive signals from damaging transistor $T_1$.

Resistors $R_{10}$ and $R_{11}$ form the collector load for transistor $T_2$ and also the feed-back resistors. In the second stage, resistors $R_{12}$ and $R_{13}$ have a similar function.

Gain adjustment is accomplished by a potentiometer $R_{14}$ connected as a rheostat between amplifier stages.

The filter is basically a low-pass filter consisting of two L sections, comprised respectively by resistor $R_{20}$ and capacitor $C_{10}$, and resistor $R_{21}$ and capacitor $C_{11}$. Frequencies above 700 cycles per second are not passed through the filter. Capacitor $C_{12}$ prevents very slow rise-time signals, such as changes in ambient sunlight, from passing through to the fast trigger logic section.

The fast trigger logic section is composed of a Schmitt trigger and a wave-forming network. Transistor $T_5$ is normally on, controlled by resistors $R_{22}$ and $R_{23}$. Capacitor $C_{13}$ bypasses $R_{22}$ to speed up the switching time of the circuit. Diode $D_5$ prevents large negative signals from damaging transistor $T_6$. Both transistors $T_5$ and $T_6$ may suitably be type 2N1302 transistors.

Capacitor $C_{14}$ and resistor $R_{24}$ form a differentiating network to change the flattop pulse of the Schmitt trigger into a positive and then negative spike.

The fast output circuitry includes a flip-flop or bistable multivibrator which directly controls the fast signal relay A. The flip-flop is formed by transistors $T_7$ and $T_8$, which may both be type 2N1302 transistors. Capacitor $C_{16}$ isolates the fast output circuitry from external D.C. circuits. If the anode side of diode $D_6$ is raised in the positive direction, the base of transistor $T_7$ will also be raised positive.

The collector load of transistor $T_8$ is made up of resistor $R_{30}$ and the winding of relay A. Resistor $R_{30}$ limits the voltage across relay A to prevent over-voltage damage.

A unijunction transistor $T_9$, which may be a type 2N491 transistor, forms an automatic reset for the flip-flop made up of transistors $T_7$ and $T_8$. Resistors $R_{31}$ and $R_{32}$ and capacitor $C_{18}$ form an adjustable time constant in the emitter of transistor $T_9$. When the collector of transistor of $T_8$ moves toward the supply voltage, due to the positive signal at the base of transistor $T_7$, the voltage across capacitor $C_{18}$ and the emitter of transistor $T_9$ start moving toward the supply voltage also. However, the rate of voltage rise is limited by $R_{31}$ and $R_{32}$. When the emitter voltage reaches approximately 60% of the voltage on base 2 of the transistor $T_9$, the transistor will conduct, developing a positive spike across resistor $R_{33}$. Upon conduction of transistor $T_9$, the charge is removed from capacitor $C_{18}$. This spike is coupled through diode $D_7$ to the base of transistor $T_8$ causing the flip-flop to return to its normal state.

Resistor $R_{30}$ of the fast output circuitry is connected to an AND gate of the slow trigger logic section. The signal from the filter is also coupled to the AND gate of the slow trigger logic section. This section includes an AND gate, an integrating circuit, a coupling transistor, and a Schmitt trigger. Zener diode $Z_3$ is used to reduce the signals coming through diode $D_{10}$ (about 16 volts) to approximate the signals coming through $D_{11}$ (4 to 10 volts). Diodes $D_{11}$ and $D_{12}$ and resistor $R_{35}$ form an AND gate. Diode $D_{13}$ shorts large negative signals to ground. Resistor $R_{36}$ and capacitor $C_{20}$ form a 150 millisecond time constant integrating circuit. The base voltage of transistor $T_{10}$, which, like transistors $T_{11}$ and $T_{12}$ may suitably be a type 2N1302 transistor, is normally low because of current flow through $R_{36}$, $D_{12}$, and $R_{37}$. When both $D_{12}$ and $D_{11}$ are prevented from conducting by application of positive voltage at their cathodes, capacitor $C_{20}$ will change toward the supply voltage. This exponentially changing voltage is coupled through transistor $T_{10}$. The time constant determined by $R_{36}$ and $C_{20}$ is such that the voltage on $C_{20}$ will not reach a value sufficient to trigger the following Schmitt trigger for approximately 50 milliseconds.

The remainder of the slow trigger logic circuitry is very similar to the fast trigger logic. The resistance of resistor $R_{40}$ is 10K ohms, as opposed to 22K ohms resistance of the corresponding resistor in the fast trigger logic section, in order to be compatible with transistor $T_{10}$. A diode corresponding to $D_5$ of the fast trigger logic section is not needed in the slow trigger logic section as diode $D_{13}$ in the slow trigger logic section performs the same function.

The slow output circuitry is similar to the fast output circuitry previously described. Transistors $T_{13}$ and $T_{14}$ form a flip-flop; both transistors may be type 2N1302 transistors. The circuit of transistor $T_{13}$ is identical to the circuit of corresponding transistor $T_7$ in the fast output circuitry. The circuit of transistor $T_{14}$ is identical to that of transistor $T_8$ of the fast output circuitry. The circuit of transistor $T_{15}$ which is a type 2N491 transistor, is similar to that of transistor $T_9$ in the fast output circuitry, the only difference being that the time constant, which in the slow output circuitry is determined by $R_{41}$ and $C_{21}$, is fixed, taking approximately one-half second to reach sufficient voltage to allow transistor $T_{15}$ to conduct.

Diodes $D_{15}$ and $D_{16}$ are in parallel with the relay coils of the fast and slow signal relays A and B respectively and suppress the voltage spike produced by sudden removal of coil voltage.

When the circuit shown in FIGURE 3 detects a thermal signal, the infrared energy of the signal is transformed into an electrical signal by the phototube and then sent on to the amplifier by the cathode follower in the sensor. The sensor output signal is a voltage of positive sense. The signal is amplified by the amplifier and coupled to the filter section. As previously explained, the filter rejects very high frequency signals and also prevents unwanted very slow rise-time signals from passing on to the fast trigger logic. The output of the filter section is coupled to the fast trigger logic and to the slow trigger logic.

A fast or slow signal of approximately 4 volts amplitude will cause the Schmitt trigger circuit in the fast trigger logic section to provide a positive pulse which is coupled to the flip-flop in the fast output circuitry, which directly controls the fast signal relay A. The pulse from the Schmitt trigger in the fast trigger logic causes the flip-flop in the fast output circuitry to change state, opening relay A; at the same time, a signal is provided to the slow trigger logic and to the unijunction transistor circuit in the fast output circuitry which controls the length of time the fast output relay will remain open. This time can be adjusted from one to three seconds, and after this time, the flip-flop in the fast output circuitry will automatically be reset and the fast signal relay A will again close.

The signal from the filter is also coupled to the AND gate in the slow trigger logic. This gate is also fed by the output from the fast output circuitry. The signal from the filter will pass through the AND gate only when the output from the fast output circuitry is also present, indicating that the signal has been preceded by a fast spike. The signal from the amplifier must be greater than approximately 50 milliseconds in duration, before the integrating will allow sufficient amplitude to be reached to cause the Schmitt trigger of the slow trigger logic to change state. Thus, the fast signal will not operate the slow trigger logic. However, if a slow rise-time signal arrives within the time set by the fast output circuitry, the slow rise-time signal will pass through the integrating circuitry in the slow trigger logic and trigger the Schmitt trigger. The output of the slow trigger logic is a positive pulse which is coupled to the slow output circuitry. The length of time the slow signal relay B remains open is not adjustable, but is preset at approximately 0.5 second. Thus, the arrival of a fast pulse only will cause the fast signal relay A to open and then close without causing the slow signal relay B to be opened. On the other hand, if a slow signal only is received, the fast signal relay will still be opened, thereby allowing the signal to pass on to the slow trigger logic and ultimately opening the slow signal relay.

It is contemplated that the contacts of relay A may be connected in series with the solenoid control of the blast valve. It is also contemplated that relay B may have multiple contacts, each connected in an appropriate operating circuit for controlling the various secondary protective measures which are to be controlled by relay B.

From the foregoing, it will be seen that we have invented a nuclear blast detector and alarm system which responds to the detection of a fast rise-time thermal signal to initiate the more time critical protective measures, and which uses a subsequent slow-rise thermal signal to confirm the previously initiated protective measures as correct, thereby avoiding the time lag which has been present in prior blast detection systems.

Having described our invention, what is claimed is:

1. In a nuclear explosion protection system including
   a primary blast protective device and at least one secondary protective device, the operation of said primary device being time critical on occurrence of a nuclear explosion, said secondary device being substantially less time critical in operation than said primary device but being less freely reversible in operation once actuated, both said primary and secondary devices being electrically controlled,
   apparatus for operating said primary and secondary devices in response to a nuclear explosion comprising,
   a sensor responsive to radiant energy to produce an electrical output corresponding in form and amplitude to said radiant energy,
   and electrical circuit means for separately actuating said primary device and said secondary device,
   said circuit means being electrically connected to said sensor and being responsive to the output from said sensor of an electrical signal corresponding to the initial radiant energy pulse of a nuclear explosion to thereupon operate said primary device but not said secondary device, said circuit means being responsive to the output from said sensor corresponding to the second radiant energy pulse of a nuclear explosion to thereupon actuate said secondary device, said circuit means including means for returning said primary device to its original status if an electrical signal corresponding to the second pulse of a nuclear explosion is not supplied by said sensor within a pre-established time interval following a signal from said sensor corresponding to the first pulse of a nuclear explosion.

2. In association with a blast shelter, the system comprising, a reversible, fluid pressure operated blast valve, electrically operated control valve means for applying said fluid pressure to open and close said blast valve, a thermal radiation sensor supplying an electrical signal corresponding to thermal radiation impinging on it, and electrical circuit means for actuating said control valve means to cause said blast valve to open and close, said circuit means being electrically connected to said sensor and being responsive to the output by said sensor of an electrical signal corresponding to the initial thermal pulse of a nuclear explosion to thereupon actuate said control valve means to close said blast valve, said circuit means including means for actuating said control valve means to reverse the closure of said blast valve if an electrical signal corresponding to the second thermal pulse of a nuclear explosion is not supplied by said sensor within a pre-established time interval following a signal from said sensor corresponding to the first thermal pulse of a nuclear explosion, said circuit means being responsive to an electrical signal from said sensor corresponding to the second thermal pulse of a nuclear explosion to actuate said control valve means to close said blast valve if said blast valve has not previously been closed.

3. The system comprising, an electrically controlled reversibly operable blast valve, electrically operated secondary devices, said secondary devices being less time critical in operation than the blast valve, a sensor responsive to thermal radiation impinging thereon to produce an electrical signal corresponding to the thermal radiation, and electrical circuit means for actuating said blast valve and said secondary devices, said circuit means being electrically connected to said sensor and being responsive to a signal from said sensor corresponding to the initial thermal pulse of a nuclear explosion, to thereupon initiate the closure of said blast valve but not to actuate said secondary devices, said circuit means being responsive to an electrical signal from said sensor corresponding to the second thermal pulse of a nuclear explosion to thereupon actuate said second devices and simultaneously to initiate the closure of said blast valve if said blast valve was not previously closed, said circuit means including means for causing said blast valve to be reopened in the event that an electical signal corresponding to the second thermal pulse of a nuclear explosion is not supplied by said sensor within a pre-established interval, not exceeding a few seconds' duration, beginning with a signal from said sensor corresponding to the first thermal pulse of a nuclear explosion.

4. The system comprising, an electrically controlled blast valve, electrically controlled secondary blast protective devices, said secondary devices being less time critical in operation than the blast valve, a sensor responsive to radiation impinging thereon to deliver an electrical signal corresponding to the radiation, and electric circuit means for separately actuating said blast valve and said secondary protective devices, said circuit means being electrically connected to said sensor and being responsive to the output by said sensor of an electrical signal corresponding to the initial pulse of a nuclear explosion, to thereupon close said blast valve, said circuit means being responsive to an electrical signal from said sensor corresponding to the second pulse of a nuclear explosion to thereupon actuate said secondary protective devices, said circuit means including electric means causing said blast valve to reopen in the event that an electrical signal corresponding to the second pulse of a nuclear explosion is not delivered by said sensor within a pre-established time interval following a signal from said sensor corresponding to the first pulse of a nuclear explosion.

5. A nuclear blast protective system including, a reversibly operable blast valve, electrically controlled means for reversibly operating said blast valve, electrically controlled secondary protective devices less time critical in operation than said blast valve, said secondary blast protective devices including air filters and auxiliary utilities, a thermal radiation responsive sensor for converting thermal radiation detected by said sensor to a corresponding electrical signal, circuit means for separately operating said blast valve and said secondary protective devices, said circuit means being actuated by signals from said sensor, said circuit means including, a fast trigger circuit closing said blast valve in response to a signal from said sensor corresponding to the fast rise-time thermal pulse of a nuclear blast, a slow trigger circuit closing said blast valve and actuating said secondary protective devices in response to a signal from said sensor corresponding to the slow rise-time thermal pulse of a nuclear blast, and electric means causing said blast valve to be reopened if a signal from said sensor corresponding to the slow rise-time pulse of a nuclear blast is not received within a fixed time interval of at most a few seconds duration following a signal corresponding to the fast rise-time pulse of a nuclear blast.

6. A nuclear blast protective system including, an air pressure operated blast valve, an electrically operated control valve for opening and closing said blast valve, electrically controlled secondary protective devices less time critical in operation than said blast valve, thermal radiation responsive sensor means for converting detected thermal radiation to corresponding electrical signals, circuit means for separately operating said control valve and said secondary protective devices, said circuit means being actuated by signals from said sensor means, said circuit means including, filter means for separating the fast electrical signal produced by said sensor means upon detection thereby of the fast rise-time initial thermal pulse of a nuclear blast from the slow signal produced by said sensor means upon detection thereby of the slow rise-time second thermal pulse of a nuclear blast, a fast trigger circuit responsive to said fast signal for closing said blast valve in response thereto, a slow trigger circuit responsive to either said fast signal or said slow signal for actuating said secondary protective devices in response thereto and simultaneously closing said blast valve if said blast valve was not previously closed by a fast signal, and fast signal actuated timing means reopening said blast valve if a slow signal is not received within a fixed time interval of at most a few seconds duration following a fast signal.

7. Apparatus comprising, a reversible blast valve capable of closing in less than about 200 milliseconds, electrically controlled pressure means operable upon actuation to selectively close and open said blast valve, and means sequentially responsive to the fast rise-time initial radiant energy pulse of a nuclear blast and to the slow rise-time second radiant energy pulse of a nuclear blast, said last named means being responsive to said initial pulse to actuate said electrically controlled pressure means to thereupon close said blast valve and to actuate said pressure means to reopen said blast valve at the end of a period of 2–10 seconds following said initial pulse if said second pulse does not occur within said period, said last named means being responsive to said second pulse to permit said blast valve to remain closed if said second pulse does occur within said period.

References Cited by the Examiner

"Nuclear Bomb Alarm System," by Champeny et al., from Electronics, volume 32, No. 19, May 8, 1959, pages 53 to 55.

RALPH, G. NILSON, *Primary Examiner.*

ARCHIE R. BORCHELT, *Examiner.*